(12) United States Patent
Oing

(10) Patent No.: US 10,001,108 B2
(45) Date of Patent: Jun. 19, 2018

(54) METHOD AND APPARATUS FOR OPERATING A WIND TURBINE WITH A VARIABLE SPEED LIMIT THAT MAY BE ABOVE OR BELOW A PREDETERMINED SPEED LIMIT DEPENDING ON WHETHER THERE IS AN ESTIMATED DETRIMENTAL OVERSPEED STATE

(71) Applicant: General Electric Company, Schenectady, NY (US)

(72) Inventor: Hubert Oing, Berlin (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 279 days.

(21) Appl. No.: 13/736,976

(22) Filed: Jan. 9, 2013

(65) Prior Publication Data

US 2014/0191506 A1    Jul. 10, 2014

(51) Int. Cl.
*G05D 3/12* (2006.01)
*G05D 5/00* (2006.01)
*G05D 9/00* (2006.01)
*G05D 11/00* (2006.01)
*F03D 7/02* (2006.01)

(52) U.S. Cl.
CPC ......... *F03D 7/0276* (2013.01); *F03D 7/0264* (2013.01); *F03D 7/0288* (2013.01); *F05B 2270/1011* (2013.01); *Y02E 10/723* (2013.01)

(58) Field of Classification Search
None
See application file for complete search history.

(56) References Cited

U.S. PATENT DOCUMENTS 8,047,770 B2    11/2011   Braicks
8,649,911 B2 *   2/2014   Avagliano .............. F03D 7/028
                                                              290/44

(Continued)

FOREIGN PATENT DOCUMENTS

EP       1903213 A2     3/2008
WO    2008031434 A2     3/2008
WO    2011150931 A2    12/2011

OTHER PUBLICATIONS

A Denmark Office Action issued in connection with corresponding DK Application No. PA201470005 dated Aug. 22, 2014.

(Continued)

*Primary Examiner* — Ziaul Karim
(74) *Attorney, Agent, or Firm* — Douglas D. Zhang; GE Global Patent Operation

(57) ABSTRACT

A method for operating a wind turbine is provided. The wind turbine includes a rotor with at least one rotor blade. The method includes determining an actual value of at least one of a first variable indicative of a failure state of the wind turbine and a second variable of the wind turbine correlated to a status of the wind turbine or an ambient status. The method further includes estimating an occurrence of a detrimental overspeed state of the wind turbine from at least one of the determined actual values, wherein a variable speed limit is adjusted based on the result of the estimation. The method further includes operating the wind turbine having regard to the variable speed limit. A control system for performing this method and a wind turbine including the control system is provided.

11 Claims, 7 Drawing Sheets

(56) References Cited

U.S. PATENT DOCUMENTS

| | | | |
|---|---|---|---|
| 2007/0216166 A1* | 9/2007 | Schubert | F03D 7/0224 290/55 |
| 2008/0296897 A1* | 12/2008 | Kovach | F16H 39/02 290/44 |
| 2009/0146424 A1 | 6/2009 | Kammer et al. | |
| 2009/0243295 A1 | 10/2009 | Kammer et al. | |
| 2011/0064573 A1 | 3/2011 | Viripullan et al. | |
| 2011/0133457 A1 | 6/2011 | Hoffmann et al. | |
| 2011/0135470 A1 | 6/2011 | Merkel | |
| 2011/0142620 A1* | 6/2011 | Loh | F03D 7/0224 416/1 |
| 2011/0153096 A1* | 6/2011 | Pal | F03D 7/047 700/287 |
| 2011/0211951 A1* | 9/2011 | Kooijman | F03D 7/0224 416/1 |
| 2011/0221194 A1 | 9/2011 | Egedal et al. | |
| 2012/0185180 A1* | 7/2012 | Frederiksen | F03D 11/0091 702/35 |
| 2012/0256422 A1* | 10/2012 | Fradella | H02K 1/2793 290/55 |
| 2015/0050145 A1* | 2/2015 | Cosack | F03D 7/0224 416/1 |

OTHER PUBLICATIONS

U.S. Appl. No. 13/114,702, filed May 24, 2011, Benjamin Paul Lacy et al.

European Search Report and Opinion issued in connection with corresponding EP Application No. 14150222.9 dated Mar. 12, 2018.

\* cited by examiner

METHOD AND APPARATUS FOR OPERATING A WIND TURBINE WITH A VARIABLE SPEED LIMIT THAT MAY BE ABOVE OR BELOW A PREDETERMINED SPEED LIMIT DEPENDING ON WHETHER THERE IS AN ESTIMATED DETRIMENTAL OVERSPEED STATE

BACKGROUND OF THE INVENTION

The subject matter described herein relates generally to methods and systems for operating a wind turbine, and more particularly, to methods and systems for operating a control system for a wind turbine and to a wind turbine comprising such a control system.

At least some known wind turbines include a tower and a nacelle mounted on the tower. A rotor is rotatably mounted to the nacelle and is coupled to a generator by a shaft. A plurality of blades extends from the rotor. The blades are oriented such that wind passing over the blades turns the rotor and rotates the shaft, thereby driving the generator to generate electricity.

Known wind turbines typically are designed and/or assembled with predefined rated power limits. To safely operate within such rated power limits, the electrical and/or mechanical components may be operated within certain operating limitations. In order to prevent early fatigue and wear of the wind turbine and its components threshold values for the mechanical and electrical components may not be exceeded.

For example, operating a wind turbine with a high rotational speed, typically results in high loads which may reduce the life time of the wind turbine and its components, respectively. Typically, a threshold value is set for the rotor speed of a wind turbine. Under certain conditions, such as high winds in the area of the wind turbine or when a failure of the drive system occurs or when the wind turbine is in an uncontrolled condition, the rotor speed may eventually exceed this threshold value.

At least some known wind turbines are designed for regulating the rotor speed of the wind turbine within a certain speed range in order to minimize the events of exceeding the threshold values.

At least some known wind turbines are designed for regulating the rotor speed within the threshold value by reducing the rotor speed or initiating an emergency shut-down.

An immediate decrease of the rotor speed, for example by mechanical braking, may result in a particularly significant increase of the load acting on components of the wind turbine. Generally, such a significant load increase negatively influences the operating lifetime of the turbine. Moreover, alternating forces may excite the resonant modes of the tower and lead to a resonant vibration of the tower. Such a resonant vibration of the tower may require shutting down the wind turbine. As a result, a loss of the capacity for generating power by the wind turbine is caused and a trip of the service staff to the wind turbine might be necessary.

Accordingly, it is desirable to provide a method and an apparatus capable of operating a wind turbine so that high loads on the wind turbine components are prevented and at the same time the number of emergency shut-downs of the wind turbine is reduced.

BRIEF DESCRIPTION OF THE INVENTION

In one aspect, a method for operating a wind turbine is provided. The wind turbine includes a rotor with at least one rotor blade. The method includes: determining an actual value of at least one of a first variable indicative of a failure state of the wind turbine and a second variable of the wind turbine correlated to a status of the wind turbine or an ambient status. This is followed by estimating an occurrence of a detrimental overspeed state of the wind turbine from at least one of the determined actual values. Then a variable speed limit is adjusted based on the result of the estimation of an occurrence of a detrimental overspeed state of the wind turbine. Finally, the wind turbine is operated having regard to the variable speed limit.

In another aspect, a control system for use with a wind turbine is provided. The wind turbine includes a rotor with at least one rotor blade. The control system is adapted for operating the wind turbine and configured to determine an actual value of at least one of a first variable indicative of a failure state of the wind turbine and of a second variable of the wind turbine correlated to a status of the wind turbine or an ambient status. Further, the control system is configured to estimate an occurrence of a detrimental overspeed state of the wind turbine from at least one of the determined actual values. The control system is configured to adjust a variable speed limit based on the result of the estimation of an occurrence of a detrimental overspeed state of the wind turbine and operate the wind turbine having regard to the variable speed limit.

In yet another aspect, a wind turbine including a rotor with at least one rotor blade is provided. The wind turbine further includes a control system for operating the wind turbine. The control system is configured operating the wind turbine by determining an actual value of at least one of a first variable indicative of a failure state of the wind turbine and a second variable of the wind turbine correlated to a status of the wind turbine or an ambient status. Further by estimating an occurrence of a detrimental overspeed state of the wind turbine from at least one of the determined actual values. This is followed by adjusting a variable speed limit based on the result of the estimation of an occurrence of a detrimental overspeed state of the wind turbine. The control system is further configures to operate the wind turbine having regard to the variable speed limit.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Figure 1:
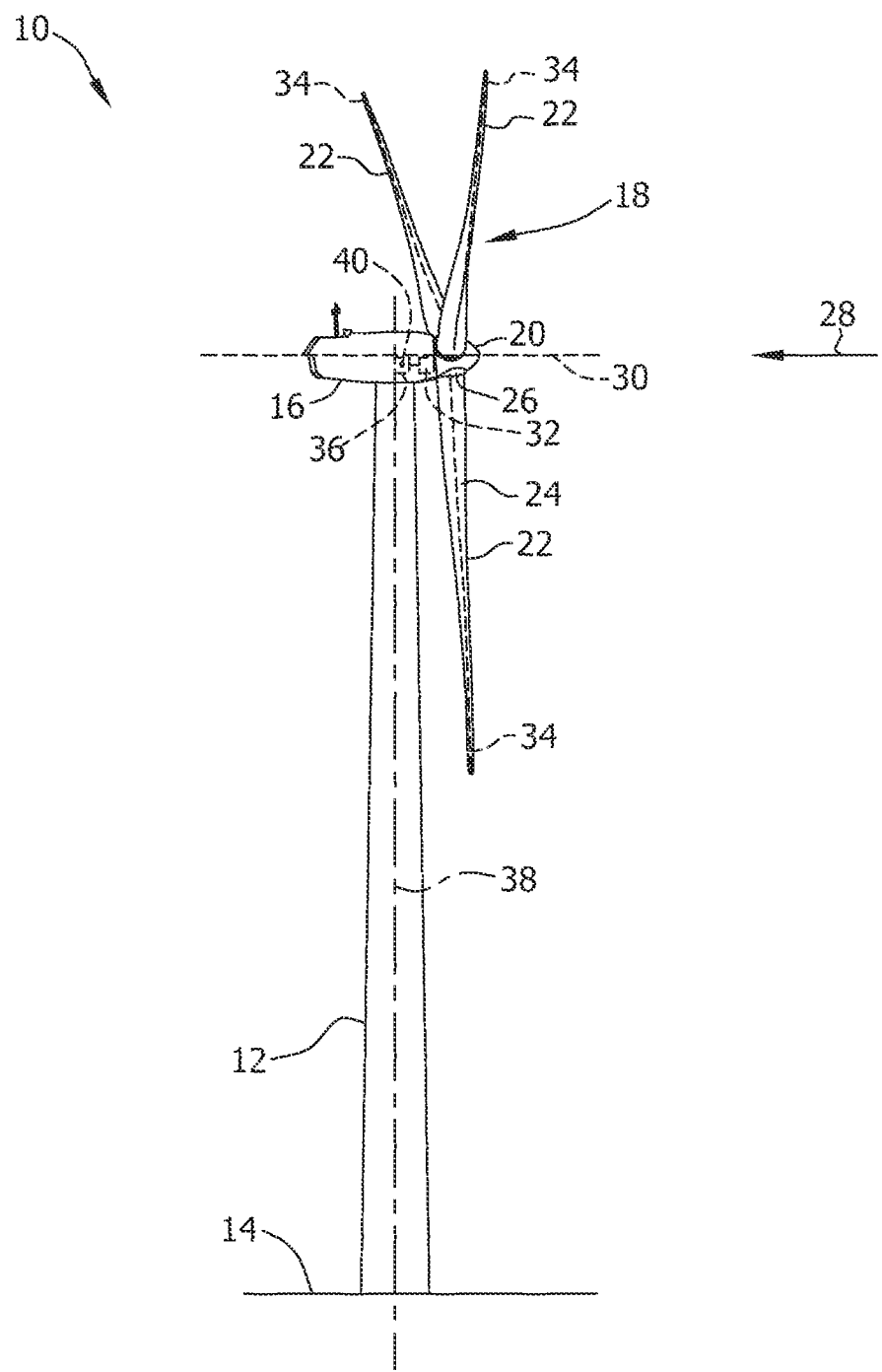
FIG. 1 is a perspective view of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Within the following description of the drawings, the same reference numbers refer to the same components. Generally, only the differences with respect to the individual embodiments are described.

As used herein, the term "blade" is intended to be representative of any device that provides a reactive force when in motion relative to a surrounding fluid. As used herein, the term "wind turbine" is intended to be representative of any device that generates rotational/kinetic energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

As used herein, the terms "predetermined speed limit", "predetermined first speed limit" or "predetermined second speed limit" are intended to be representative of a threshold value for the rotor speed of a wind turbine that is pre-set. Typically, the rotor speed of wind turbines is regulated in accordance with the rated power of the wind turbine. For an efficient and/or safe operation of the wind turbine the rotor speed should usually not exceed the threshold value, i.e. such as the predetermined speed limit. In order to avoid damages to the electrical and/or mechanical components of the wind turbine caused by exceedance of the predetermined speed limit the rotor speed is typically regulated having regard to the threshold value, such as the predetermined speed limit.

According to embodiments described herein, the wind turbine is operated by regulating the rotor speed of the wind turbine having regard to a variable speed limit. The adjustment of a variable speed limit typically depends on the current situation of the wind turbine or the current situation at the wind turbine. In this way the rotor speed can be regulated within a certain range, which can be wider when no detrimental overspeed state is estimated and narrower when a detrimental overspeed state is estimated.

As used herein, the term "at the wind turbine" is intended to be representative of a region at or in the proximity of the wind turbine. "At the wind turbine" may correspond to components of the wind turbine, for example the tower of the wind turbine, or components which are attached to the wind turbine, for example an anemometer. "In the proximity of the wind turbine" may correspond to an area surrounding the wind turbine within a radius of up to 100 m. Preferably, the radius is up to 50 m, and even more preferably up to 10 m. For example, the current situation at the wind turbine may correspond to the measurements of an anemometer which is installed at a distance of 10 m from the wind turbine.

In general, the exemplary wind turbines as known in the art are adapted for regulating the rotor speed, i.e. rotational speed of the rotor, having regard to a predetermined first speed limit. The predetermined first speed limit of at least some known wind turbines depends on such factors as the velocity threshold of the spinning parts of the wind turbine, the speed limit of the generator, or the occurrence of certain failures which can cause excitation problems.

The variable speed limit is different from the predetermined first speed limit as used in the state of the art and is adjusted on the basis of the result of an estimate. The estimate includes the occurrence of a detrimental overspeed state of the wind turbine and is based on the at least one of determined actual values of one or multiple variables of the wind turbine. The estimate may include a calculation and/or an evaluation using the at least one of determined actual values of one or multiple variables. The result of the estimate may be directed to indicators by which the occurrence of a detrimental overspeed state may be predicted. Such indicators may be a possible future wind turbine status, for example the power output, or a possible future rotor speed or a possible future occurrence of a failure, such as a pitch failure.

A detrimental overspeed state arises for example when an immediate safety braking is inevitable, for example due to a grid loss, or the aerodynamic braking would have a decisive effect due to high loads on the fatigue resistance of the wind turbine. Moreover, a detrimental overspeed state arises when the resonant vibration of the wind turbine, in particular the tower, exceeds a maximum allowable limit.

An early reaction on an imminent detrimental overspeed state by introducing a variable speed limit prevents the wind turbine, in particular the mechanical and electrical components thereof, from being exposed to high loads. At the same time, needless trips to the wind turbine site after shut-down can be reduced, downtimes minimized and times of inefficient operation of the wind turbine decreased. A shut-down of the wind turbine is for example not utterly necessary when no detrimental overspeed state is estimated and consequently a crucial damage of turbine components is not imminent even if the wind turbine continues to operate.

As used herein, the term "variable" is intended to be representative of a magnitude varying over time that is related to the wind turbine, a connected system thereto or the surroundings of the wind turbine.

At least one of the variables, referred to as the first variable, is indicative of a failure state of the wind turbine. For example, the first variable may be an electrical power loss event, which may include a power grid loss, malfunctioning of the turbine electrical system or a failure of the wind turbine control system. These examples of the first variable indicate a failure state of the wind turbine when the generator experiences a loss of load. Alternatively, the first variable may be, a bending of one or more rotor blades, a blade offset, or a pitch failure, particularly a failure status of the modulation of the blade pitch of the associated rotor blade or malfunction of a pitch bearing or malfunction of one or more parts of the pitch assembly or of the pitch drive motor or disruption of the signals from control system. Such examples for the first variable may indicate a failure state of the wind turbine when the rotational speed of the rotor, in particular of the blades, increases uncontrollably and sharply, respectively.

At least one of the variables, referred to as the second variable, is correlated to a status of the wind turbine or an ambient status. For example, the second variable may correlate to an ambient status such as the wind speed and/or the wind direction at the wind turbine. The second variable may correlate to a status of the wind turbine such as, but not limited to, the power output of the turbine, in particular the power output of an electric generator forming part of the wind turbine, the rotor speed or the rotor acceleration of the turbine. These examples of the second variable indicate a status of the wind turbine or an ambient status when their respective value exceeds the maximum allowable value. A list of the respective maximum allowable values is for example saved in the control system of the wind turbine. For the performance of the estimate, as described herein, these saved values may be compared to the actual values.

As used herein, the term "actual value of a variable" is intended to be representative of a magnitude which is determined by the wind turbine system or a connected system, in particular by the components and/or a measuring system of the wind turbine, or is retrieved from an external component or system, for example a measuring device, such as a sensor.

For example, an actual value of the variable "rotor speed" may be determined from a measurement of the revolutions of the rotor per minute through a sensor. As another example, an actual value of the variable "rotor acceleration" may correspond to a direct measurement of the acceleration through a sensor coupled to the rotor. Alternatively, an actual value of the variable "rotor acceleration" may be determined by the rate of change over time of actual values of the rotor speed, which may be inferred from a time series of rotor speed values.

For example, an actual value of the variable "electrical power loss event" may be determined by a measurement of the power output of the wind turbine or, according to the exemplary embodiments, of an electrical current or voltage of the wind turbine. An actual value of the variable "electrical power loss event" may alternatively be determined by a signal from the grid operator.

For example, an actual value of the variable "wind speed" or "wind direction" may be determined by a data output from a wind vane and/or an anemometer.

Variables of the wind turbine or the surroundings of the wind turbine described herein may be determined by any suitable method that enables operation of a wind turbine as described herein.

Based on the determined actual single value or multiple values, such as described above, an occurrence of a detrimental overspeed state of the wind turbine is estimated. The estimation of occurrence of a detrimental overspeed state of the wind turbine may correspond to a comparison of the determined value(s) of the respective variable(s) to preselected values, which represent the respective threshold values. The estimation may be based on one value or a combination of several values. The value(s) may come from only one variable or a combination of several variables.

The embodiments described herein include a wind turbine system that is adapted to flexibly react on the current situation by adjusting a variable speed limit according to a possible occurrence of a detrimental overspeed state. As the wind turbine system is typically not constrained by predetermined speed limits it can be operated at high levels of efficiency. The onset of a detrimental overspeed state can be estimated at an early stage so that high loads on the wind turbine and the parts of the wind turbine, especially mechanical components forming the turbine, can be prevented or at least reduced. Identifying a harmless future status of the wind turbine or at the wind turbine (wind turbine surroundings), for which the occurrence of a detrimental overspeed state is low, avoids, or at least decreases, unnecessary emergency shut-downs and/or trips of the service staff to the turbine site as well as downtimes and operating times of low efficiency.

Exceeding of the variable speed limit may trigger certain actions or events, such as reducing the rotor speed, capturing less power or mechanically braking the rotor to a standstill, i.e. an emergency shut-down.

According to embodiments, the wind turbine is operated having regard to a combination of the variable speed limit and an additional predetermined first and/or second speed limit. The predetermined first or second speed limit may trigger an emergency shut-down, while the variable speed limit may initiate, for example, reducing the rotor speed or capturing less power and is adjusted based on the result of the estimation an occurrence of a detrimental overspeed state of the wind turbine. Regulating the rotor speed having regard to both a predetermined first or second speed limit and the variable speed limit, results in a very effective and efficient operation of the wind turbine at the desired rated power with a high level of security at the same time.

According to embodiments, the estimation of an occurrence of a detrimental overspeed state of the wind turbine may be based on one first/second variable or on a certain combination of the first and second variables. The estimation may not only be based on one variable indicative of a failure state, status of the wind turbine or an ambient status, but also the occurrence of two failures that occur one after another, for example, may be taken into account. This allows a high flexibility of the wind turbine system on the current situation. An identified failure state, which is estimated not to lead to a detrimental overspeed state, can have a large effect on the fatigue damage and therefore lead to a detrimental overspeed state when another failure state is additionally identified.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In a variable embodiment, rotor 18 includes more or less than three rotor blades 22. In the exemplary embodiment, tower 12 is fabricated from tubular steel to define a cavity (not shown in FIG. 1) between support system 14 and nacelle 16. In a variable embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
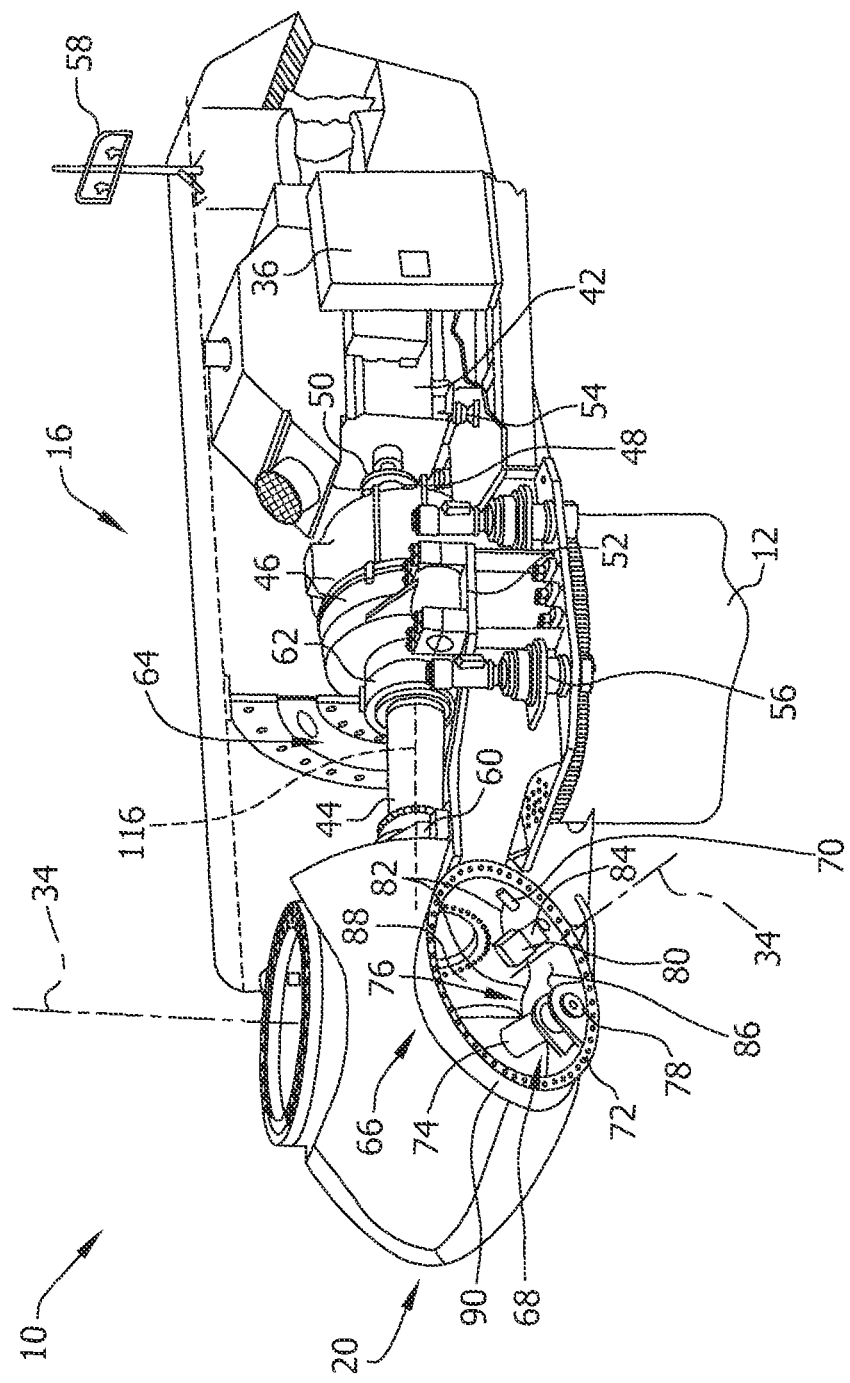
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In a variable embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In a variable embodiment, pitch drive system 68, sensor 70, overspeed control system 80, cables 82, and power generator 84 are positioned with respect to an outer surface 90 of hub 20 and may be coupled, directly or indirectly, to outer surface 90.

Figure 3:
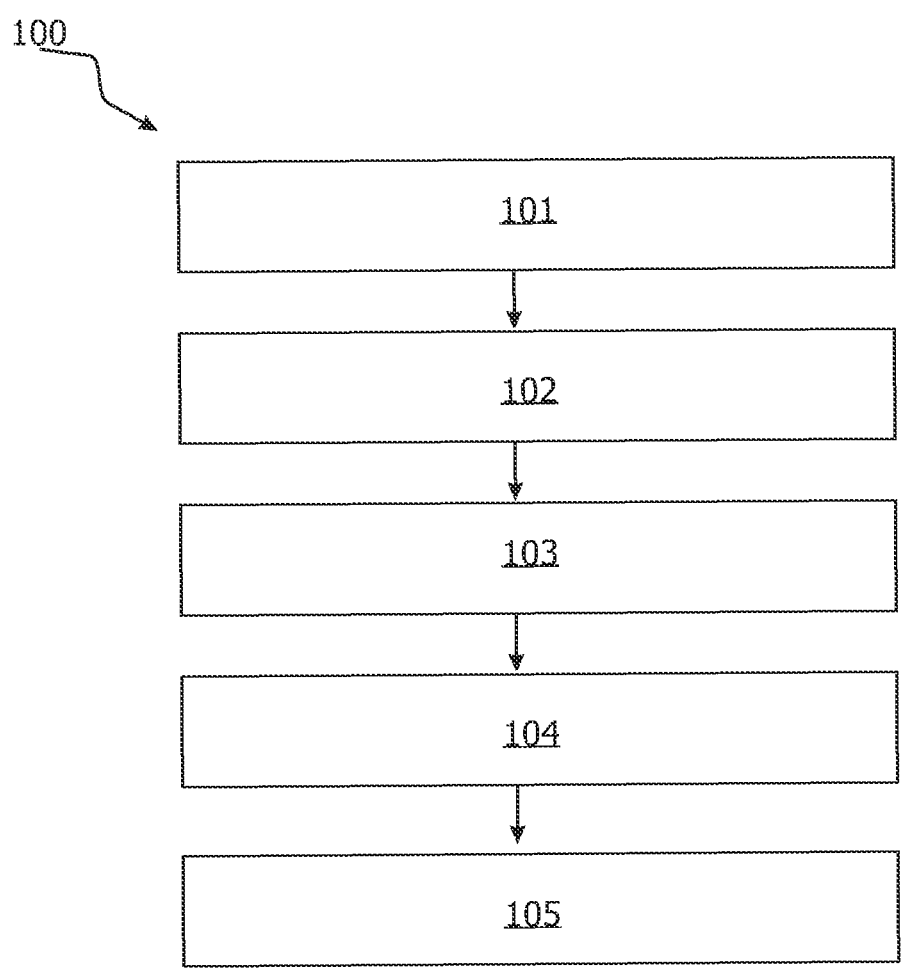
FIG. 3 is a flow chart illustrating an exemplary method for operating the wind turbine according to embodiments described herein.

FIG. 3 is a flow chart illustrating an exemplary method 100 for operating a wind turbine, such as the wind turbine 10 in FIG. 1. In the exemplary embodiment, method 100 includes determining 101 an actual value of a first variable indicative of a failure state of the wind turbine 10. For example, the first variable may be an electrical power loss event, which may include a power grid loss or malfunctioning of the turbine electrical system. Alternatively, the first variable may be for example a pitch failure, a bending of one or more rotor blades, such as rotor blades 22, or a blade offset, such as an offset of blades 22, or any other variable which indicates a failure state of the wind turbine.

Exemplary method 100 further includes determining 102 an actual value of a second variable of the wind turbine correlated to a status of the wind turbine or an ambient status. For example, the second variable corresponds to the wind speed and/or the wind direction in the surroundings of the wind turbine, the power output of the wind turbine, the rotor speed or the rotor acceleration of the wind turbine.

Exemplary method 100 further includes estimating 103 an occurrence of a detrimental overspeed state of the wind turbine 10 from at least one of the determined actual values. The values are determined from at least one of the first and second variables.

Exemplary method 100 further includes adjusting 104 a variable speed limit based on the result of the estimation of the occurrence of a detrimental overspeed state. Finally, exemplary method 100 includes operating 105 the wind turbine, in particular regulating 105 the rotor speed of the wind turbine, having regard to the variable speed limit.

According to some embodiments, the estimation 103 of the occurrence of a detrimental overspeed state includes identifying a future rotor speed based on at least one of the determined actual values of at least one of the first and/or second variables and, optionally, comparing the identified future rotor speed with a preselected rotor speed value for identifying a detrimental overspeed state of the wind turbine. For example, and not limited to the method of FIG. 3, the estimation 103 of the occurrence of a detrimental overspeed state can be carried out by identifying the time period for reaching a preselected rotor speed value based on at least one of the determined actual values of the first and the second variables and comparing the identified time period with a predetermined time period. Alternatively, the estimation of the occurrence of a detrimental overspeed state may include validating at least one of the determined actual values of the first and the second variables by comparing these values with a list of preselected values.

Figure 4:
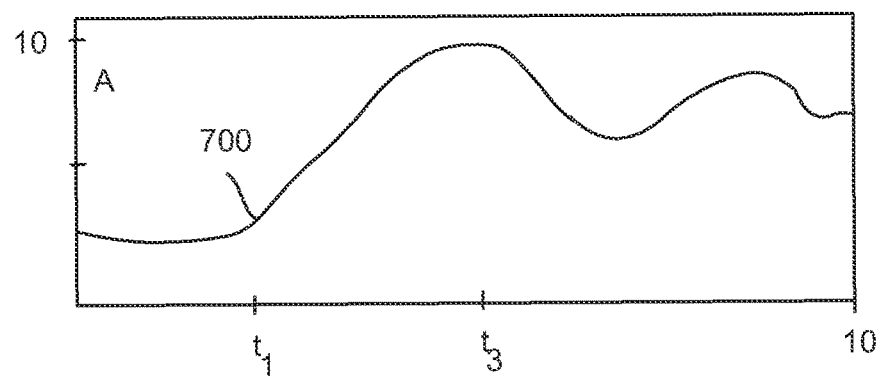
FIG. 4 is a graphical representation of an exemplary wind course during a time period of 10 minutes.

FIG. 4 shows an exemplary time series graph of a wind speed 700 that typically leads to an increase of a rotor speed. The unit of the wind speed, which is plotted on the vertical axis, is meter per seconds and the unit of the time, which is plotted on the horizontal axis, is minutes.

Figure 5:
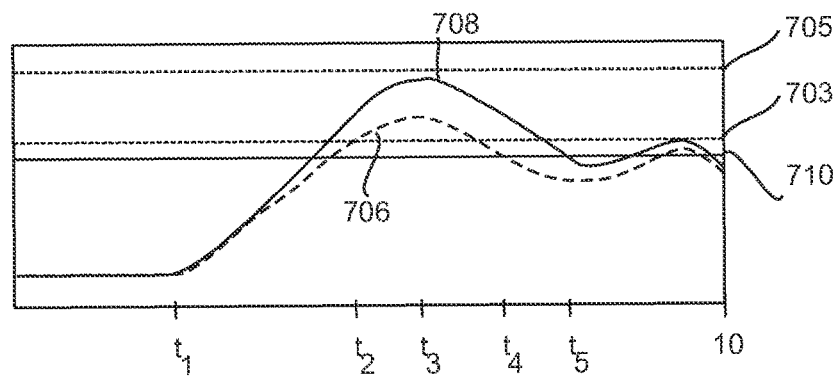
FIG. 5 is a schematic graphical representation of the operation of the wind turbine according to embodiments described herein with a variable speed limit.

The increase of the rotor speed caused by the increasing wind speed 700 is shown in FIG. 5 for at least one known wind turbine (dashed line 706), and for a wind turbine according to the exemplary embodiments as described herein (line 708). The unit of the rotor speed, which is plotted on the vertical axis, is revolution per minute. The unit of the time, which is plotted on the horizontal axis, is minutes. The time period shown in FIG. 5 corresponds to 10 minutes.

FIG. 5 schematically illustrates the response of a wind turbine according to the embodiments described herein, which is operated having regard to a variable speed limit compared to the response of a known wind turbine, which is operated having regard to a predetermined speed limit.

The rated rotor speed of both the exemplary wind turbine and the known wind turbine corresponds to line 710. Due to the increase of the wind speed 700 the rotor speed of the known wind turbine 706 exceeds at time t1 both the value of the rated rotor speed (line 710) and the value of a predetermined rotor speed 703, which is set 11% above the rated rotor speed 710. In the known wind turbine, the control sets the operation of the wind turbine such that the rotor speed is decreased as soon as rotor speed 706 exceeds predetermined value 703, that is, at time t2. As a result, the rotor speed 706 rises slower and reaches the value of the rated rotor speed 710 at time t4. Subsequently, the rotor speed 706 rises and falls according to the course of the wind speed 700, whereby a certain fluctuation of the rotor speed 706 is also a result of the regulatory measures of the control system 36.

FIG. 5 also shows the rotor speed 708 of the wind turbine according to embodiments described herein. At time t1 an actual value of a first and a second variable is determined, from which the occurrence of a detrimental overspeed state is estimated. In particular, the control system 36, or alternatively the overspeed control system 80, of the exemplary embodiment records data corresponding to the first and second variable.

The recorded data of the first variable indicative of a failure state of the wind turbine correspond to events affecting the wind turbine negatively, such as a blade offset, a pitch failure and a grid loss. This means that the actual occurrence of events such as a blade offset a pitch failure and a grid loss or the like is monitored. At time t1, no such event is monitored. Thus the failure state of the wind turbine is negative.

In addition to the first variable, also actual values of the second variable correlated to an ambient status are determined at time t1. The ambient status corresponds to the wind status in the surroundings of the exemplary wind turbine. Accordingly, the second variable of the wind status is the current wind speed. Alternatively, the second variable corresponds to the wind direction, a history of the wind speed during a certain time period or the like. At time t1 the current value and the history of the wind speed are detected by an anemometer and a sensor system, such as sensor 70.

Based on the negative failure state of the wind turbine and the recorded value and/or history of the wind speed, the control system 36, or alternatively the overspeed control system 80, of the exemplary embodiment calculates or estimates the occurrence of a future detrimental overspeed state. The result of the estimation of the occurrence of a future detrimental overspeed state is negative, which means that no overspeed state is expected for the future. According to an embodiment, the existing first predetermined speed limit 703 is overwritten and replaced by the variable speed limit 705. As in the example of FIG. 5 there is no event negatively affecting the wind turbine in addition to the increase of the wind speed 700 the variable speed limit 705 can be set above the predetermined first speed limit 703, for instance, up to 10% or even 15% above the predetermined first speed limit 703.

As a consequence of adjusting the variable speed limit 705 above the predetermined first speed limit 703 the rotor speed of the exemplary wind turbine 708 is not reduced at time t2 and hence further rises according to the increase of the wind speed 700 (see FIG. 5). At time t3 the rotor speed 708 of the exemplary wind turbine reaches its maximum value due to the maximum wind at that time. Subsequently, the rotor speed 708 rises and drops depending on the increase and decrease of the wind speed 700. At time t5, the rotor speed 708 reaches the rated rotor speed 710 according to the decrease of the wind speed 700 shown in FIG. 4.

In the case that the rotor speed 708 would rise above the level shown in FIG. 5, the variable speed limit 705 would be exceeded and reducing the rotor speed 708 would start in order to decrease the rotor and prevent a detrimental overspeed state of the wind turbine.

Even though the rotor speed 708 exceeds the predetermined speed limit for some time, no damage is caused to the mechanical and electrical components of the wind turbine. A significant increase of the load acting on components of the wind turbine by an immediate decreasing of the rotor speed (as for a known wind turbine 706) can be avoided and the operating life of the turbine may be extended. In addition, regulating the rotor speed of a known wind turbine (line 706) having regard to the predetermined speed limit 703 by increasing and decreasing the rotor speed generally results in alternating forces acting on the tower. In some cases, these alternating forces may excite the resonant modes of the tower and lead to a resonant vibration of the tower. As there is no need to amend the rotor speed of the exemplary wind turbine (line 708) in the given example of FIG. 5 such a resonant vibration of the tower and a possibly necessary shut-down of the wind turbine are prevented.

Figure 6:
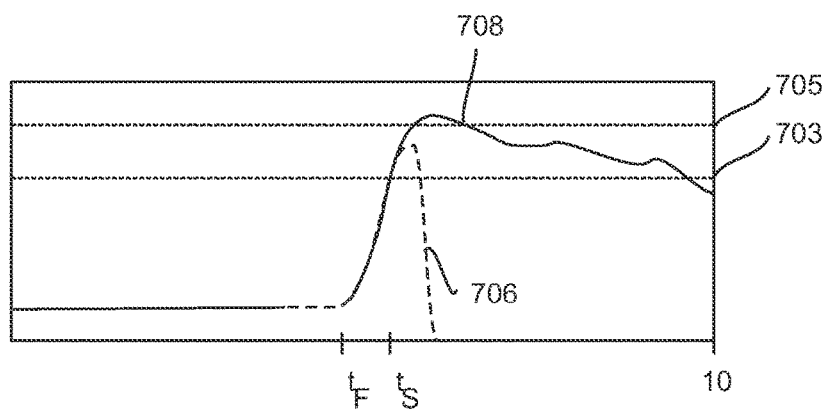
FIG. 6 is another schematic graphical representation of the operation of the wind turbine according to embodiments described herein with a variable speed limit.

FIG. 6 shows another situation of a wind turbine according to the embodiments, whose rotor speed is regulated having regard to a variable speed limit as described herein in comparison to a known wind turbine having regard to a predetermined speed limit. For the details concerning the diagram, such as axes, units and the like, reference is made to FIG. 5.

The response of a known turbine on the occurrence of a failure, such as a blade offset, at time tF is an increase of the rotor speed 706. When the rotor speed 706 reaches the first predetermined speed limit 703 an emergency shut-down is initiated, that is at time tS. For the exemplary embodiment, at time tF, an actual value of a first variable is determined, from which the occurrence of a detrimental overspeed state is estimated. The first variable corresponds to a failure state, in particular a blade offset, of the wind turbine. The control system 36, or alternatively the overspeed control system 80, of the exemplary embodiment calculates or estimates the occurrence of a future detrimental overspeed state. This can be carried out by classifying the current event, such as a blade offset, according to its degree of dangerousness. Events, which are classified as hazardous to the wind turbine, in particular to the operating lifetime or the mechanical components thereof, may require an emergency shut-down, while other events, which are classified less hazardous, may not require such a response, another action or not any action. The event of a blade offset does not require a rough decelerating of the rotor to a standstill.

According to an embodiment, overwriting the predetermined first speed limit 703 (dashed line) by the variable speed limit 705 (dashed line) gives the wind turbine system time to react on the occurrence of the failure. In this case, the control system 36, or alternatively the overspeed control system 80, of the exemplary embodiment can react on the current situation by decelerating the rotor speed 708 of the wind turbine and fixing the blade offset. The advantage of introducing a variable speed limit is that the wind turbine system can flexibly react on the current situation, such as the occurrence of a failure. Unnecessary emergency shut-downs followed by downtimes can be avoided and trips of the wind turbine service staff can be reduced.

Figure 7:
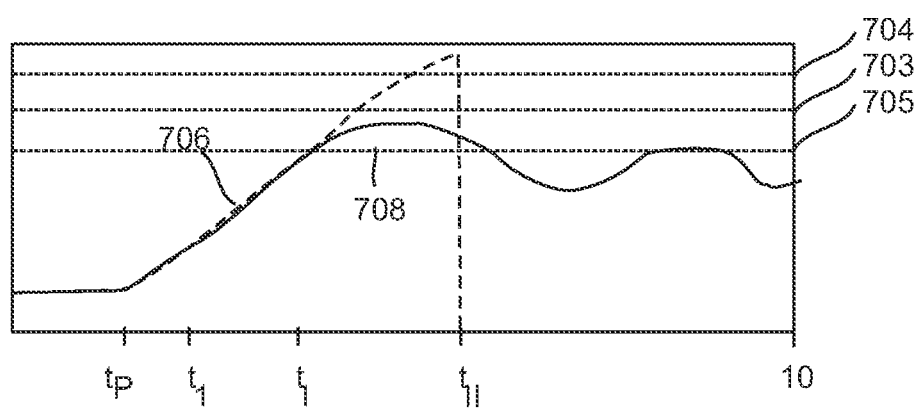
FIG. 7 is yet another schematic graphical representation of the operation of the wind turbine according to embodiments described herein with a variable speed limit.

FIG. 7 schematically illustrates the response of a wind turbine according to embodiments described herein, which is regulated having regard to a variable speed limit compared to the response of a known wind turbine regulated having regard to two predetermined speed limits. For details concerning axes, units and the like, reference is made to FIG. 5. The wind speed acting on the exemplary turbine is shown in FIG. 4.

FIG. 7 shows the behavior of the rotor speed of a known wind turbine 706 in comparison to the behavior of the rotor speed of an exemplary wind turbine 708. At time tP, a failure, such as a pitch failure, occurs. This results in an increase of the rotor speeds of both the known wind turbine 706 and the exemplary embodiment of a wind turbine 708.

At time t1 the wind speed 700 (see FIG. 4) notably increases with the consequence that rotor speed 706 increases even more. The rotor speed of the known wind turbine 706 rises until the predetermined first speed limit 703 is reached at time tI. After exceedance of the first speed limit 703, at time tI, the control system 36, or alternatively the overspeed control system 80, tries to reduce the rotor speed of the known wind turbine. Due to the occurrence of the pitch failure decreasing the rotor speed of the known wind turbine is not successful. As a consequence, the rotor speed 706 rises until it exceeds a predetermined second speed limit 704 at time tII, which triggers the immediate emergency shut-down of the wind turbine by actively braking the rotor by means of the emergency system. The result is high loads on the mechanical and electrical parts of the known wind turbine and the need for service staff at the turbine site in order restart the known wind turbine.

With the exemplary embodiment, already at time t1 the pitch failure is identified as a result of the determination of an actual value, namely a malfunctioning of the pitch assembly 66, in particular the unsuccessful modulating of the blade pitch of an associated rotor blade 22. As the occurrence of a pitch failure at the given wind speed is not harmful to the exemplary wind turbine and the components of the wind turbine no strong reaction of the wind turbine system, such as braking of the rotor or an emergency shut-down is required. As a result, no detrimental overspeed state is estimated at time tP.

However, at time t1, a high increase of the wind velocity according to the increase of the wind speed 700 is determined. On the basis of the determination of the actual values and the estimation of the occurrence of a detrimental overspeed state carried out at time tP with the result of a pitch failure, another estimation of the occurrence of a detrimental overspeed state is carried out at time t1. Due to the coincidence of two different events, namely the occurrence of the pitch failure and the increase of the wind speed, a detrimental overspeed state is estimated at time t1.

As a consequence, the variable speed limit 705 is adjusted well below the predetermined first 703 and second 704 speed limit. Subsequently, the control system 36, or alternatively the overspeed control system 80, tries to reduce the rotor speed 708 of the exemplary wind turbine. The result is a slow-down of the increase of the rotor speed 708 according to the variable speed limit 705. The adjustment of a variable speed limit gives the wind turbine system enough time to react on the occurrence of an event, such as a pitch failure or the increase of the wind speed. In the case that the pitch failure cannot be fixed and the rotor speed continues increasing, the predetermined second speed limit 704 may still be activated and may function as an emergency setup.

In contrast to known wind turbine systems, the exemplary embodiments describe herein are typically not subjected to high loads caused by a sudden emergency braking. This positively contributes to the operating lifetime of the wind turbine.

Exemplary embodiments of systems and methods for operating a wind turbine are described above in detail. The systems and methods are not limited to the specific embodiments described herein, but rather, components of the systems and/or steps of the methods may be utilized independently and separately from other components and/or steps described herein. For example, the method may evaluate values of a variable determined through a sensor and values of another variable determined using a suitable mathematical model having as input the first variable and other dynamic variables, such as wind speed, and are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine, the wind turbine including a rotor with at least one rotor blade, said method comprising:
    operating the wind turbine based on a variable speed limit, the variable speed limit being adjusted on a basis of a result of an estimate;
    determining an actual value of a first variable indicative of a failure state of the wind turbine and an actual value of a second variable of the wind turbine correlated to a status of the wind turbine or an ambient status;
    estimating an occurrence of a detrimental overspeed state of the rotor the wind turbine from the determined actual value of the first variable and the determined actual value of the second variable, wherein said estimation of the occurrence of the detrimental overspeed state of the rotor of the wind turbine comprises identifying a future rotor speed based on determined actual values and comparing the identified future rotor speed with a preselected rotor speed value; and adjusting the variable speed limit based on the estimation, wherein adjusting the variable speed limit further comprises decreasing the variable speed limit below a predetermined first speed limit when a detrimental overspeed state of the rotor is estimated and increasing the variable speed limit above the predetermined first speed limit when no detrimental overspeed-state of the rotor is estimated.

2. The method according to claim 1, wherein said first variable corresponds to one of an electrical power loss event, a bending of one or more rotor blades, a blade offset, or a pitch failure.

3. The method according to claim 1, wherein said second variable corresponds to one of a wind speed at the wind turbine, a wind direction at the wind turbine, a power output, a rotor speed or a rotor acceleration of the wind turbine.

4. The method according to claim 1, further comprising operating the wind turbine having regard to a combination of the variable speed limit, the predetermined first speed limit and a predetermined second speed limit.

5. The method according to claim 1, wherein said estimation of an occurrence of a detrimental overspeed state of the rotor of the wind turbine is based on a combination of said first variable and another first variable and said second variable.

6. The method according to claim 1, wherein said estimation of an occurrence of a detrimental overspeed state of the rotor of the wind turbine is based on a combination of said second variable and another second variable and said first variable.

7. The method according to claim 1, wherein a rotor speed of the rotor is reduced when the variable speed limit is exceeded.

8. A control system for use with a wind turbine, the wind turbine including a rotor with at least one rotor blade, said control system being adapted for operating the wind turbine, said control system being configured to:
  operate the wind turbine based on a variable speed limit, the variable speed limit being adjusted on a basis of a result of an estimate;
  determine an actual value of at least one of a first variable indicative of a failure state of the wind turbine and an actual value of a second variable of the wind turbine correlated to a status of the wind turbine or an ambient status;
  estimate an occurrence of a detrimental overspeed state of the rotor of the wind turbine from the determined actual value of the first variable and the determined actual value of the second variable, wherein said estimation of the occurrence of the detrimental overspeed state of the rotor of the wind turbine comprises identifying a future rotor speed based on determined actual values and comparing the identified future rotor speed with a preselected rotor speed value; and,
  adjust the variable speed limit based on the estimation, wherein adjusting the variable speed limit further comprises decreasing the variable speed limit below a predetermined speed limit when a detrimental overspeed state of the rotor is estimated and increasing the variable speed limit above the predetermined speed limit when no detrimental overspeed state of the rotor is estimated.

9. The control system according to claim 8, wherein said first variable corresponds to one of an electrical power loss event, a bending of one or more rotor blades, a blade offset, or a pitch failure.

10. The control system according to claim 8, wherein said second variable corresponds to one of wind speed and wind direction at the wind turbine, a power output, a rotor speed or a rotor acceleration of the wind turbine.

11. A wind turbine comprising:
  a) a rotor with at least one rotor blade; and
  b) a control system for operating said wind turbine, the control system being configured to:
    operate the wind turbine based on a variable speed limit, the variable speed limit being adjusted on a basis of a result of an estimate;
    determine an actual value of at least one of a first variable indicative of a failure state of the wind turbine and an actual value of a second variable of the wind turbine correlated to a status of the wind turbine or an ambient status,
    estimate an occurrence of a detrimental overspeed state of the rotor of the wind turbine from the determined actual value of the first variable and the determined actual value of the second variable, wherein said estimation of the occurrence of the detrimental overspeed state of the rotor of the wind turbine comprises identifying a future rotor speed based on determined actual values and comparing the identified future rotor speed with a preselected rotor speed value; and,
    adjust the variable speed limit based on the estimation, wherein adjusting the variable speed limit further comprises decreasing the variable speed limit below a predetermined speed limit when a detrimental overspeed state of the rotor is estimated and increasing the variable speed limit above the predetermined speed limit when no detrimental overspeed state of the rotor is estimated.

* * * * *